US010626489B2

(12) United States Patent
Grensing et al.

(10) Patent No.: US 10,626,489 B2
(45) Date of Patent: Apr. 21, 2020

(54) WEAR-RESISTANT CU—NI—SN COATING

(71) Applicant: Materion Corporation, Mayfield Heights, OH (US)

(72) Inventors: Fritz C. Grensing, Perrysburg, OH (US); Robert E. Kusner, Mayfield Heights, OH (US); David J. Krus, Mayfield Heights, OH (US); William D. Nielsen, Houston, TX (US); Karl Ziegler, Mayfield Heights, OH (US)

(73) Assignee: MATERION CORPORATION, Mayfield Heights, OH (US)

( * ) Notice: Subject to any disclaimer, the term of this patent is extended or adjusted under 35 U.S.C. 154(b) by 147 days.

(21) Appl. No.: 15/792,295

(22) Filed: Oct. 24, 2017

(65) Prior Publication Data
US 2018/0112302 A1    Apr. 26, 2018

Related U.S. Application Data

(60) Provisional application No. 62/411,828, filed on Oct. 24, 2016.

(51) Int. Cl.
| | |
|---|---|
| *C23C 4/08* | (2016.01) |
| *C23C 24/04* | (2006.01) |
| *C22C 9/06* | (2006.01) |
| *F16C 33/12* | (2006.01) |

(52) U.S. Cl.
CPC .................. *C23C 4/08* (2013.01); *C22C 9/06* (2013.01); *C23C 24/04* (2013.01); *F16C 33/121* (2013.01); *F16C 2223/42* (2013.01)

(58) Field of Classification Search
CPC ... C23C 4/08; C23C 24/04; C22C 9/06; F16C 33/121; F16C 2223/42
USPC .......................................................... 428/457
See application file for complete search history.

(56) References Cited

U.S. PATENT DOCUMENTS

| 4,596,189 | A | * | 6/1986 | Halpern | .................. | B41N 1/08 |
| | | | | | | 101/458 |
| 5,198,044 | A | * | 3/1993 | Colijn | ...................... | C22C 9/02 |
| | | | | | | 148/514 |
| 2006/0093736 | A1 | | 5/2006 | Raybould et al. | | |
| 2006/0166020 | A1 | | 7/2006 | Raybould et al. | | |

FOREIGN PATENT DOCUMENTS

EP    2878840 A1    6/2015

OTHER PUBLICATIONS

International Search Report from PCT Application No. PCT/US2017/058101 dated Jan. 25, 2018.

* cited by examiner

*Primary Examiner* — William K Cheung
(74) *Attorney, Agent, or Firm* — Fay Sharpe LLP

(57) ABSTRACT

The present disclosure relates to a method of applying a wear-resistant copper-nickel-tin coating to a substrate using a thermal spray process. Briefly, a copper-nickel-tin alloy feedstock is converted into a powder or droplet form, then sprayed onto a substrate to form a coating thereon.

25 Claims, 2 Drawing Sheets

WEAR-RESISTANT CU—NI—SN COATING

CROSS-REFERENCE TO RELATED APPLICATIONS

This application claims priority to U.S. Provisional Patent Application Ser. No. 62/411,828, filed Oct. 24, 2016. The entirety of that application(s) is incorporated fully by reference.

BACKGROUND

The present disclosure relates to methods for coating a substrate. In particular, the coating methods are directed to a thermal spray using a copper-nickel-tin (Cu—Ni—Sn) alloy as a feedstock material that results in improved coating characteristics from known techniques, and will be described with particular reference thereto. However, it is to be appreciated that the present disclosure is also amenable to other like applications.

It would be desirable to develop new methods of thermal spray processing that use a wear resistant copper based alloy to build up a coating on the surface of an object/substrate.

BRIEF DESCRIPTION

The present disclosure relates to methods of applying a wear-resistant copper-nickel-tin coating to a substrate using a thermal spray process. A copper-nickel-tin alloy feedstock is placed into a thermal spray housing. Heat is applied to the copper-nickel-tin alloy to melt the alloy. The melted copper-nickel-tin alloy is mixed with a carrier (e.g. a gas). The resulting copper-nickel-tin alloy mixture is distributed upon a substrate to provide a coating thereon. In particular embodiments, the copper-nickel-tin alloy has about 14.5 wt % to about 15.5 wt % nickel, about 7.5 wt % to about 8.5 wt % tin, and the remaining balance is copper. The thermal spray process is one of a cold spray, plasma spray, warm spray, detonation spray, high-velocity oxy fuel spray, or an arc spray. A weld overlay coating can be formed using these methods.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
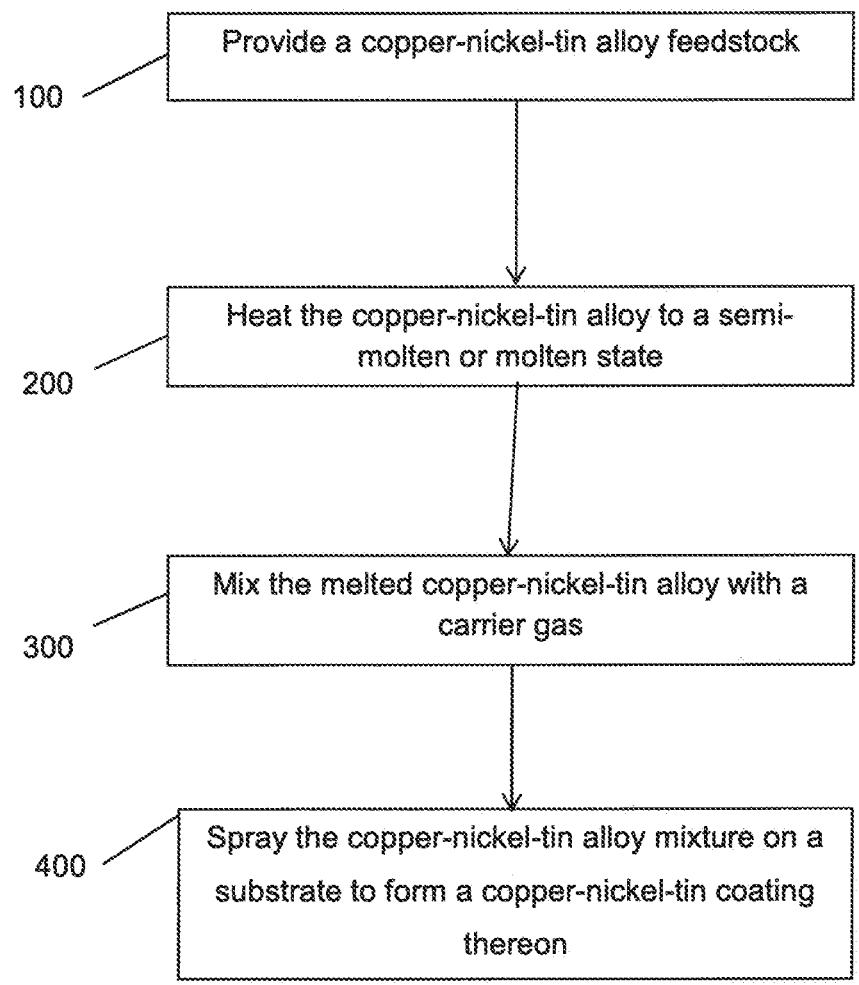
FIG. 1 is a flow chart illustrating an exemplary method of the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

A value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4." The term "about" usually refers to plus/minus 10% of the stated value.

BF 158 is a copper-nickel-tin alloy that includes about 14.5 wt % to about 15.5 wt % nickel, about 7.5 wt % to about 8.5 wt % tin, and the remaining balance is copper. This alloy is a spinodally-hardened material that is formed into end-use applications such as electronic connectors, switches, sensors and springs that can be used in various industrial and commercial applications. This high-performance alloy is available in heat treatable or mill hardened form and is designed to provide formability, strength and stress relaxation characteristics that are similar to copper beryllium alloys.

Spinodal alloy structures are made of homogeneous two phase mixtures that are produced when the original phases are separated under certain temperatures and compositions. The original alloy phases spontaneously decompose into other phases in which the crystal structure remains the same, but the atoms within the crystal structure are different. Spinodal hardening increases the yield strength of the base metal and includes a high degree of uniformity of composition and microstructure ToughMet 3 is a copper-nickel-tin alloy that includes about 15 wt % nickel, 8 wt % tin, and the remaining balance is copper. This high-strength alloy is initially cast, heat worked or cold worked, then spinodally-hardened and formed into a desired end-use application. This alloy is used in heavy machinery and displays increased lubricant properties while being durable and machinable.

Thermal spraying techniques such as cold spraying or arc spraying are processes in which temperature-treated materials are sprayed onto a surface. Precursor materials available for thermal spraying include metals, alloys, ceramics, plastics and composites. They are fed in powder or wire form, heated to a molten or semi-molten state and accelerated towards substrates in the form of a powder or micrometer-size particles. Combustion or electrical arc discharge is usually used as the source of energy for thermal spraying. The fine particles or droplets are sprayed at/upon/onto a substrate to form a coating.

Thermal spraying can provide coatings over a large area at high deposition rate as compared to other coating processes such as electroplating, physical, and chemical vapor deposition. The resultant coating may range in thickness from about 20 micrometers to 3 or more millimeters, depending on the process and materials used.

Coating quality is usually assessed by measuring its porosity, oxide content, macro and micro-hardness, bond strength and surface roughness. Generally, the coating quality increases with increasing particle velocities. However, there has not been a thermal spray process that has utilized particular metal alloys as a feedstock.

A particular high strength metal alloy, such as a copper-nickel-tin alloy, is known to be used in various industrial and commercial applications. In particular, a copper-nickel-tin alloy, such as Brushform® 158 (BF 158) provided by Materion Corporation, is sold in various forms and is a high-performance, heat treated alloy that allows a designer to form the alloy into electronic connectors, switches, sensors, springs and the like. These alloys are generally sold as a wrought alloy product in which a designer manipulates the alloy into a final shape through working rather than by casting. However, various types of known copper-nickel-tin alloys have formability limitations related to known copper beryllium alloys.

Additionally, another high strength metal alloy, ToughMet 3, also provided by Materion Corporation, is sold in various forms such as hot worked, cold worked and cast that is spinodally hardened that exhibits improved resistance to corrosion, durability, and lubricity from other high-strength alloys. This alloy is generally used in wear plates, bushings and bearings for aircraft, industrial equipment and heavy equipment. It is also used for oil and gas drilling hardware including pressure housings, rotary steering housings and other instruments related to heavy equipment.

FIG. 1 is a flowchart that illustrates an exemplary method of utilizing a copper-nickel-tin alloy in a thermal spraying process for coating a surface that improves coating properties relative to known feedstock alloys.

Initially, the feedstock is provided 100. The copper-nickel-tin alloy is considered the feedstock for the coating process. This coating process uses thermal spraying equipment. The equipment is suitable for use with various known thermal spraying techniques such as cold spray, plasma spray, warm spray, detonation spray, high-velocity oxy fuel spray, and arc spray. In particular, with an arc spray process, a wire-fed arc or flame gun is used to deposit the coating on the substrate. The feedstock is usually provided in the form of a wire.

The composition of the feedstock can vary depending on the type of thermal spray process utilized. Desirably, the copper-nickel-tin alloy includes from about 8 wt % to about 22 wt % nickel (Ni), from about 4 wt % to about 10 wt % tin (Sn), and copper (Cu) generally being the remaining percentage (ie. from about 68 wt % to about 88 wt %). In more specific embodiments, the Cu—Ni—Sn alloy contains about 14.5 wt % to about 15.5 wt % nickel, about 7.5 wt % to about 8.5 wt % tin, with the remaining balance being copper (i.e. about 76 wt % to about 78 wt %). In specific embodiments, the alloy contains about 15 wt % nickel, about 8 wt % tin, and about 77 wt % copper.

Next, the alloy is heated (reference numeral 200) by exposure to a high temperature. In some processes such as cold spray, the alloy is heated to a range from about 350° C. to about 700° C., or from about 400° C. to about 600° C. The alloy feedstock can be described as heated or semi-molten. In other processes, the alloy is heated to a temperature of about 780° C. to about 1115° C. to melt the alloy. Generally, the temperature can range from about 350° C. to about 1115° C., depending on the thermal spray process that is used.

A carrier gas 300 is then sprayed past/through the semi-molten alloy feedstock. Typically, the carrier is a gas. The present disclosure is not limited as to the types of gases utilized. However, especially in a cold spray process, the gases utilized therein may be selected from at least one of air, nitrogen, helium and argon. The spraying may occur at a pressure of about 20 bar to about 40 bar, or from about 30 bar to about 40 bar. This results in the semi-molten feedstock being blown/separated into particles or droplets. These particles or droplets can be very fine, having an average diameter that is generally from about 1 micrometer to about 20 micrometers. The type and size of the particles can be varied as needed to produce a coating with the desired features.

The resulting alloy mixture (of Cu—Ni—Sn alloy and carrier) is then deposited upon a desired substrate 400. The spraying may occur at a pressure of about 20 bar to about 40 bar, or from about 30 bar to about 40 bar. The alloy mixture may have a temperature of about 350° C. to about 700° C., or from about 400° C. to about 600° C., or from about 780° C. to about 1115° C., depending on the process used. The alloy particles/droplets cool and form a coating. During impact with the substrate, the alloy particles undergo plastic deformation and adhere to the substrate. The kinetic energy of the particles, supplied by the expansion of the carrier gas, is converted to plastic deformation energy during bonding. The resulting copper-nickel-tin alloy coating has a generally matte type finish. Of course, the spraying may occur in the same area multiple times, resulting in the coating being built up of multiple layers. Each layer may have a thickness of about 100 micrometers to about 200 micrometers. The resulting coating may have, in particular embodiments, a thickness of about 100 micrometers to about 2000 micrometers. This thickness will depend on the number of layers used to make up the coating. In particular embodiments, the Cu—Ni—Sn coating has a thickness of about 1200 micrometers to about 1600 micrometers.

In one embodiment, the feedstock alloy is a generally wire shaped product which can be both hot and cold worked.

Various types of thermal spray equipment can be employed for this process. In particular, the equipment can include a housing with a heating chamber, a mixing chamber and a nozzle. Once the alloy is melted and mixed with the carrier, the resulting alloy mixture is distributed through the nozzle of the equipment at a generally high velocity that can vary between 50 meters/second (m/s) to 1500 m/s. More particularly, the velocity can range between 100 m/s to about 1000 m/s depending on the type of thermal spray equipment and alloy mixture. A critical velocity can be developed to identify which velocity of the alloy mixture should be discharged from the nozzle and apply to the substrate that result in the highest rate of adherence to the substrate.

Cold spraying is particularly contemplated as the thermal spray process used herein. The initial physical and chemical properties of the alloy are retained and the heating of the substrate is minimal, resulting in cold-worked microstructure of coatings where no melting and solidification happen. The resulting coatings have high thermal and electrical conductivity; good density and hardness; high homogeneity; and low shrinking. Process advantages include a short stand off distance; minimum surface preparation; low energy consumption; ability to use on complex shapes and internal surfaces; high productivity; high deposition rates and efficiencies; no toxic wastes; no combustion; and increased operational safety due to the absence of high temperature gas jets and radiation.

This coating process can be applied to generally any type of work piece or substrate that requires a wear resistant surface. For example, wear rings can be coated with the copper-nickel-tin alloy. The use of a wear resistant copper based alloy can build up a coating on the substrate and could also be used to build up a coating layer to repair a workpiece. In the instance when it is desirable to produce a rather large workpiece having specific tolerance, this coating process can be utilized when other processes fail to efficiently create a monolithically manufactured workpiece. In this instance, large workpieces can be manufactured with good wear properties.

The following examples are provided to illustrate the methods of the present disclosure. The examples are merely illustrative and are not necessarily intended to limit the disclosure to the materials, conditions, or process parameters set forth therein.

EXAMPLES

Example 1

Cold sprayed samples of ToughMet 3 (Cu-15Ni-8Sn) were characterized. The spray pressure and spray temperature were varied, and the coating thickness was measured. All samples were sprayed using identical motion parameters for a total of 10 layers. The results are shown in Table A:

TABLE A

| Sample | Spray Pressure (bar) | Spray Temp (° C.) | Coating Thickness (μm) |
|---|---|---|---|
| 1 | 30 | 400 | 1400 |
| 2 | 35 | 400 | 1500 |
| 3 | 40 | 500 | 1400 |
| 4 | 35 | 600 | 1250 |
| 5 | 35 | 660 | 1300 |

Figure 2A:
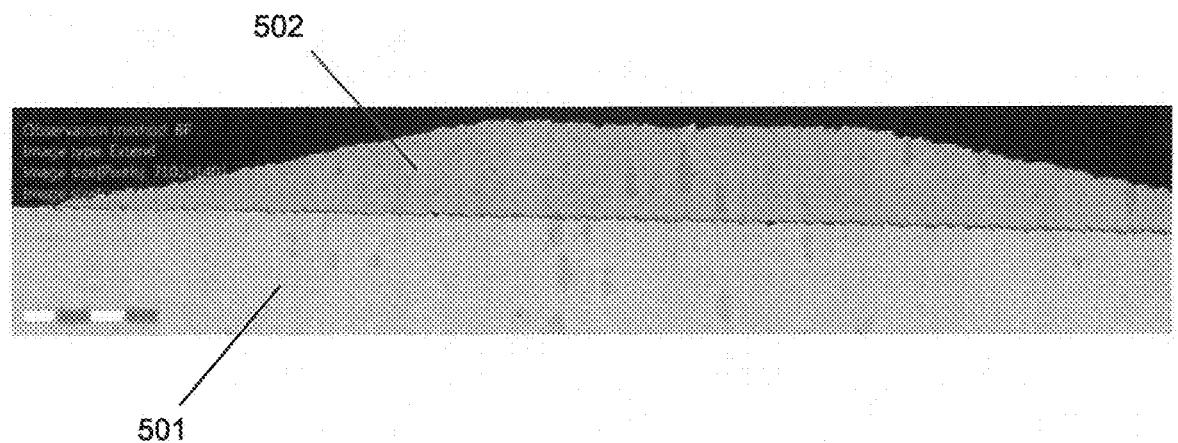
FIG. 2A is a picture showing a cross-section of a substrate with a metal alloy coating deposited thereon.
Figure 2B:
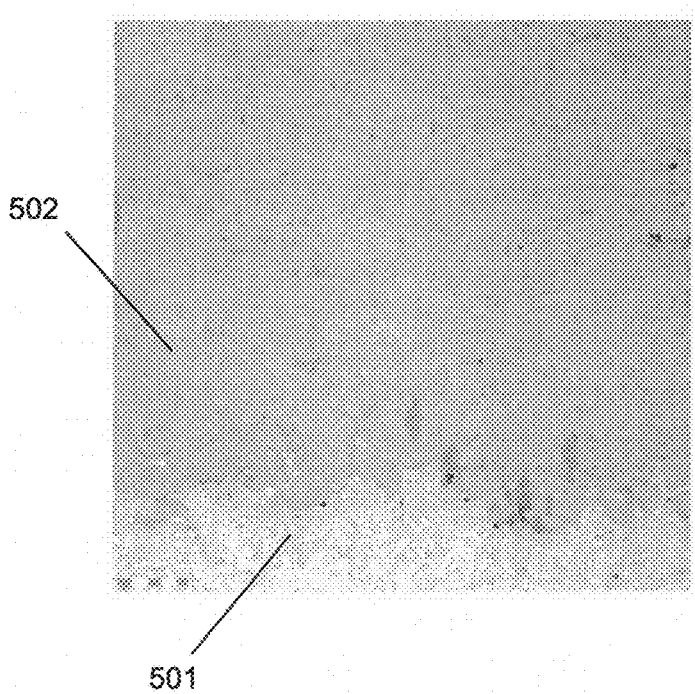
FIG. 2B is a magnified view of the interface of the substrate and the metal alloy coating.

FIG. 2A is a picture of a cross-section of Sample 3. The substrate is labeled with reference numeral 501, and the deposited metal alloy coating is labeled with reference numeral 502. It is noted that the "comet tail" artifacts in the upper region of the coating are a byproduct of overpolishing, and are not indicative of coating porosity. FIG. 2B is a magnified view of the interface between the substrate and the coating.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. A method of applying a wear-resistant copper-nickel-tin coating to a substrate using a thermal spray process, the steps comprising:
    applying heat to a copper-nickel-tin alloy provided as a feedstock in the shape of a wire;
    mixing the heated copper-nickel-tin alloy with a carrier gas to form a copper-nickel-tin alloy mixture; and
    spraying the resulting copper-nickel-tin alloy mixture upon a substrate to provide a spinodal outer coating thereon.

2. The coating method of claim 1, wherein the copper-nickel-tin alloy is about 8 wt % to about 22 wt % nickel, about 4 wt % to about 10 wt % tin, and the remaining balance is copper.

3. The coating method of claim 1, wherein the thermal spray process is a cold spray, plasma spray, warm spray, detonation spray, high-velocity oxy fuel spray, or arc spray process.

4. The coating method of claim 1, wherein the spraying occurs at a pressure of about 20 bar to about 40 bar.

5. The coating method of claim 1, wherein the alloy mixture has a temperature of about 350° C. to about 700° C.

6. The coating method of claim 1, wherein the coating has a thickness of about 100 micrometers to about 2000 micrometers.

7. The coating method of claim 1, wherein the alloy mixture is sprayed at a velocity of 50 m/s to 1500 m/s.

8. A method of applying a wear-resistant copper-nickel-tin coating to a substrate using a thermal spray process, the steps comprising:
    applying heat to a copper-nickel-tin alloy;
    mixing the heated copper-nickel-tin alloy with a carrier gas to form a copper-nickel-tin alloy mixture; and
    spraying the resulting copper-nickel-tin alloy mixture upon a substrate to provide a spinodal outer coating thereon, wherein the spraying occurs at a pressure of about 20 bar to about 40 bar.

9. The coating method of claim 8, wherein the copper-nickel-tin alloy is about 8 wt % to about 22 wt % nickel, about 4 wt % to about 10 wt % tin, and the remaining balance is copper.

10. The coating method of claim 8, wherein the thermal spray process is a cold spray, plasma spray, warm spray, detonation spray, high-velocity oxy fuel spray, or arc spray process.

11. The coating method of claim 8, wherein the alloy mixture has a temperature of about 350° C. to about 700° C.

12. The coating method of claim 8, wherein the coating has a thickness of about 100 micrometers to about 2000 micrometers.

13. The coating method of claim 8, wherein the alloy mixture is sprayed at a velocity of 50 m/s to 1500 m/s.

14. A method of applying a wear-resistant copper-nickel-tin coating to a substrate using a thermal spray process, the steps comprising:
    applying heat to a copper-nickel-tin alloy;
    mixing the heated copper-nickel-tin alloy with a carrier gas to form a copper-nickel-tin alloy mixture; and
    spraying the resulting copper-nickel-tin alloy mixture upon a substrate to provide a spinodal outer coating thereon, wherein the coating has a thickness of about 100 micrometers to about 2000 micrometers.

15. The coating method of claim 14, wherein the copper-nickel-tin alloy is about 8 wt % to about 22 wt % nickel, about 4 wt % to about 10 wt % tin, and the remaining balance is copper.

16. The coating method of claim 14, wherein the thermal spray process is a cold spray, plasma spray, warm spray, detonation spray, high-velocity oxy fuel spray, or arc spray process.

17. The coating method of claim 14, wherein the spraying occurs at a pressure of about 20 bar to about 40 bar.

18. The coating method of claim 14, wherein the alloy mixture has a temperature of about 350° C. to about 700° C.

19. The coating method of claim 14, wherein the alloy mixture is sprayed at a velocity of 50 m/s to 1500 m/s.

20. A method of applying a wear-resistant copper-nickel-tin coating to a substrate using a thermal spray process, the steps comprising:
   applying heat to a copper-nickel-tin alloy;
   mixing the heated copper-nickel-tin alloy with a carrier gas to form a copper-nickel-tin alloy mixture; and
   spraying the resulting copper-nickel-tin alloy mixture upon a substrate to provide a spinodal outer coating thereon, wherein the alloy mixture is sprayed at a velocity of 50 m/s to 1500 m/s.

21. The coating method of claim 20, wherein the copper-nickel-tin alloy is about 8 wt % to about 22 wt % nickel, about 4 wt % to about 10 wt % tin, and the remaining balance is copper.

22. The coating method of claim 20, wherein the thermal spray process is a cold spray, plasma spray, warm spray, detonation spray, high-velocity oxy fuel spray, or arc spray process.

23. The coating method of claim 20, wherein the spraying occurs at a pressure of about 20 bar to about 40 bar.

24. The coating method of claim 20, wherein the alloy mixture has a temperature of about 350° C. to about 700° C.

25. The coating method of claim 20, wherein the coating has a thickness of about 100 micrometers to about 2000 micrometers.

* * * * *